US009342208B2

(12) United States Patent
Howes et al.

(10) Patent No.: US 9,342,208 B2
(45) Date of Patent: May 17, 2016

(54) SYSTEM AND METHOD FOR OPTIMIZING WINDOW DISPLAY

(75) Inventors: Timothy Howes, Los Altos, CA (US); Eric Vishria, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 459 days.

(21) Appl. No.: 13/192,366

(22) Filed: Jul. 27, 2011

(65) Prior Publication Data

US 2012/0030616 A1 Feb. 2, 2012

Related U.S. Application Data

(60) Provisional application No. 61/367,936, filed on Jul. 27, 2010.

(51) Int. Cl.
*G06F 3/01* (2006.01)
*G06F 3/0481* (2013.01)
*G06F 3/00* (2006.01)

(52) U.S. Cl.
CPC .... *G06F 3/0481* (2013.01); *G06F 2203/04803* (2013.01)

(58) Field of Classification Search
USPC .......... 715/800, 761, 781, 788; 345/173, 207, 345/212, 690
See application file for complete search history.

(56) References Cited

U.S. PATENT DOCUMENTS

| 5,758,111 | A |   | 5/1998 | Shiratori et al. |
|---|---|---|---|---|
| 5,796,402 | A | * | 8/1998 | Ellison-Taylor ............... 715/792 |
| 5,874,962 | A | * | 2/1999 | de Judicibus et al. ........ 715/789 |
| 5,923,307 | A | * | 7/1999 | Hogle, IV ......................... 345/4 |
| 5,977,973 | A | * | 11/1999 | Sobeski et al. ................. 715/798 |
| 6,166,736 | A |   | 12/2000 | Hugh |
| 6,597,358 | B2 | * | 7/2003 | Miller ........................... 345/427 |
| 7,036,089 | B2 | * | 4/2006 | Bauer ............................ 715/827 |
| 7,080,326 | B2 | * | 7/2006 | Molander et al. .............. 715/788 |
| 8,156,444 | B1 | * | 4/2012 | Lawrence et al. .............. 715/788 |
| 8,381,127 | B2 | * | 2/2013 | Singh et al. .................... 715/803 |
| 8,386,956 | B2 | * | 2/2013 | Ording et al. .................. 715/797 |
| 8,572,657 | B2 | * | 10/2013 | Lee .................................. 725/47 |
| 2002/0191028 | A1 | * | 12/2002 | Senechalle et al. ............ 345/800 |
| 2006/0095863 | A1 | * | 5/2006 | Van Leeuwen ............... 715/788 |
| 2007/0101289 | A1 | * | 5/2007 | Awada et al. .................. 715/784 |
| 2007/0192726 | A1 | * | 8/2007 | Kim et al. ...................... 715/781 |
| 2008/0066006 | A1 | * | 3/2008 | Kim ............................... 715/781 |
| 2008/0133487 | A1 | * | 6/2008 | Gross ................. G06F 17/30864 |
| 2008/0307352 | A1 | * | 12/2008 | Chaudhri et al. .............. 715/788 |
| 2009/0031243 | A1 |   | 1/2009 | Kano et al. |
| 2009/0031248 | A1 | * | 1/2009 | Kano et al. .................... 715/790 |
| 2009/0172556 | A1 | * | 7/2009 | Malmstrom .......... G06F 3/0481 715/736 |
| 2009/0187851 | A1 | * | 7/2009 | Liu ................................ 715/788 |
| 2009/0193358 | A1 |   | 7/2009 | Mernyk et al. |
| 2010/0058230 | A1 | * | 3/2010 | Shing ............................ 715/788 |
| 2010/0125806 | A1 | * | 5/2010 | Igeta ............................. 715/770 |

(Continued)

OTHER PUBLICATIONS

PCT International Search Report and Written Opinion, PCT Application No. PCT/US11/45619, Sep. 16, 2011, 11 pages.

*Primary Examiner* — Toan Vu
(74) *Attorney, Agent, or Firm* — Weaver Austin Villeneuve & Sampson LLP

(57) ABSTRACT

A system and method for efficiently displaying multiple windows is disclosed. The system displays two adjacent windows such that adjusting a first window also adjusts a second window adjacent to the first window. For example, the system determines whether to resize or move the first window in response to receiving a window adjustment input. Based on this determination, the system determines a new location for the second window and displays the second window in the new location.

15 Claims, 4 Drawing Sheets

(56) References Cited

U.S. PATENT DOCUMENTS

| | | | | |
|---|---|---|---|---|
| 2010/0192085 A1* | 7/2010 | Yamazaki | G01C 21/3664 | 715/773 |
| 2010/0287496 A1* | 11/2010 | Kim et al. | | 715/798 |
| 2013/0125046 A1* | 5/2013 | Gaul et al. | | 715/790 |
| 2013/0125050 A1* | 5/2013 | Goshey | | 715/800 |
| 2013/0339869 A1* | 12/2013 | Stinson, III | | 715/741 |

* cited by examiner

SYSTEM AND METHOD FOR OPTIMIZING WINDOW DISPLAY

CROSS-REFERENCE TO RELATED APPLICATION

This application claims the benefit of U.S. Provisional Application No. 61/367,936, filed Jul. 27, 2010, which is hereby incorporated by reference in its entirety.

BACKGROUND

The disclosure generally relates to browser applications, in particular to providing a window system associated with a browser application that efficiently uses the browser display window.

A computer application or an operating system supports multiple simultaneous windows. For example, a user may open numerous file explorer windows such that different windows display content of different folders. Similarly, a user may open numerous web browser windows, chat windows, online feed windows and other application windows displaying different content from various sources.

Simultaneously open windows beneficially allow a user to quickly switch between various applications, various parts within an application or various web sites. However, use of simultaneous windows creates the challenge of managing the limited desktop space available to display these windows. Because of the limited desktop space, most of the windows are either minimized or hide behind the window in the foreground. A user therefore has to switch between various windows and the user does not have a convenient means for viewing multiple windows simultaneously.

SUMMARY

Embodiments of the invention enable a windows module to efficiently display multiple windows. In one embodiment, the windows module displays two adjacent windows such that adjusting a first window also adjusts a second window adjacent to the first window. In one embodiment, the windows module displays the second window in a location that does not block the view of the first window. In another embodiment, the windows module displays the two windows with at least one of their edges touching each other. Alternatively, the edges of the two windows need not touch and the windows module displays the two windows separately. In one embodiment, the windows module receives an input requesting separation of the windows and the windows module displays the two adjacent windows as separate windows. Additionally, when a window is brought within a threshold distance of another window, the windows module combines the two windows and displays the two windows as adjacent windows.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A windows module in an application, like a browser, manages simultaneous display of multiple windows associated with an application. The windows module beneficially manages the window display such that the displayed windows do not hinder or block each other's view when a user so desires. Additionally, the windows module beneficially automates the windows placement process freeing the user from the tedious manual labor of placing the windows in the exact position to avoid wastage of desktop space. For example, the windows module displays a secondary window resulting from or related to a primary window such that the borders of the two windows overlap with each other without requiring any manual adjustment. Additional benefits and examples of efficient window placement are discussed below.

Figure 1:
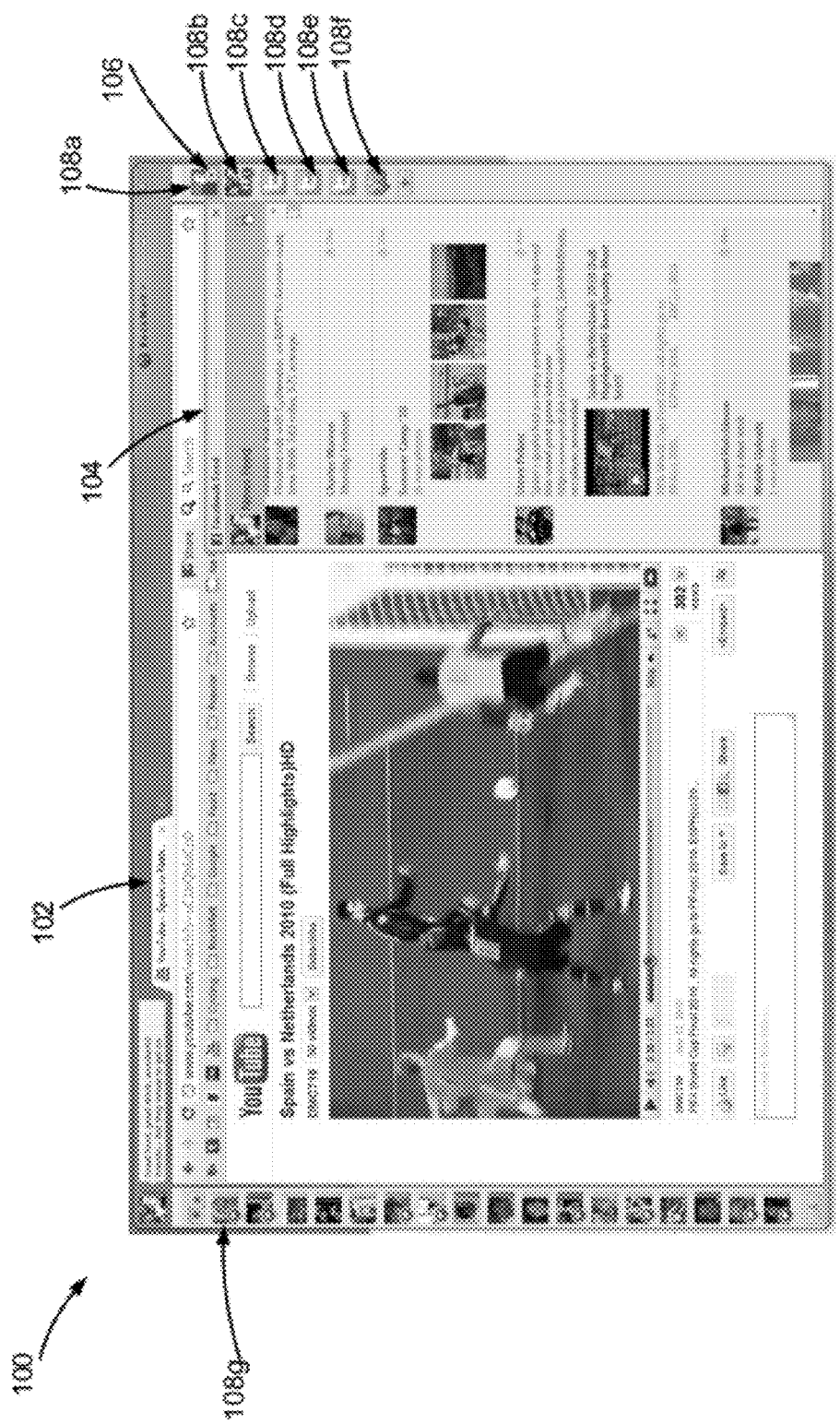
FIG. 1 is a first embodiment of a user interface illustrating a primary window and a secondary window displayed adjacent to each other.

FIG. 1 illustrates a browser 100 including a primary window 102, a secondary window 104 and selectable icons 108*a-g*. The icons 108*a-g* represent various applications like social networking applets integrated into the browser 100. In response to selection of icons 108*a-g*, the windows module associated with browser 100 may display a secondary window 104 related to the selected icon 108*a-g*. The windows module may also display the secondary window 104 in response to selection of a link in a web page displayed in the primary window 102 or selection of an option in toolbar of the browser 100.

The windows module may display the secondary window 104 adjacent to one of the sides, i.e., edges, of the primary window 102. Accordingly, the windows module may place the secondary window 104 vertically or horizontally adjacent to the primary window 102. In one embodiment, the adjacent windows are separated from each other such that the edges of each of the adjacent windows are separated from each other by a threshold distance. In another embodiment, the adjacent windows contact or overlap each other such that at least one of the edges of each of the adjacent windows touches another. In one embodiment, a user may configure the windows module through an interface to always display the secondary window 104 in a particular alignment with the primary window 102. The user therefore may choose a configuration where the secondary window 104 is always displayed horizontally adjacent or vertically adjacent to the primary window 102. Additionally, the windows module may display the secondary window 104 immediately adjacent to the selected item whose selection caused the display of secondary window 104. For example, referring to FIG. 1, the windows module has displayed the secondary window 104 next to the icon 108*c* whose selection led to display of the secondary window 104. Similarly, the windows module could have displayed the secondary window 104 next to the icon 108*g* if the secondary window 104 was displayed in response to selection of icon 108*g*. Displaying the secondary window 104 next to the source of the secondary window 104 beneficially communicates to the user that the secondary window 104 is related to the source. Moreover, this placement beneficially enables the user to locate the secondary window 104 related to a particular icon 108*a-g*. The user need not inspect multiple secondary windows 104 to determine the secondary window 104 related to icon 108*c*. The user only needs to look next to icon 108*c* to locate the related secondary window 104.

In one embodiment, the browser 100 opens a limited number of secondary windows 104. The number of displayed secondary windows 104 may be configurable through a graphical user interface associated with the browser 100. Accordingly, if the browser 100 is configured to display only one secondary window 104, the windows module closes or minimizes the previous secondary window 104 when another secondary window 104 is displayed in response to a user selection. In one embodiment, the windows module displays all the minimized secondary windows 104 associated with a particular application in response to a user command like selection of a hot key. For example, in response to receiving ctl-shift-c selection, the windows module can display all the minimized secondary windows 104 associated with a chat application, each secondary window 104 displaying a chat session between the user and the user's various online friends.

Additionally, when multiple secondary windows 104 are displayed, the user may select one or more secondary windows 104 and the windows module may highlight the selected windows and grey out the other displayed secondary windows 104. Moreover, the windows module may receive a user input indicating the user's desire to preview all the minimized secondary windows 104 or minimized secondary windows 104 associated with a particular application or a website. Consequently, the windows module may display previews of the requested secondary windows 104 to the user. The user can then select one of the previews and the windows module maximizes the secondary window 104 associated with the selected preview.

Additionally, the windows module initially displays the secondary window 104 on top of the primary window 102. In another embodiment, the windows module may display the secondary window outside the browser 100 or partially on top of the primary window 102.

Figure 2:
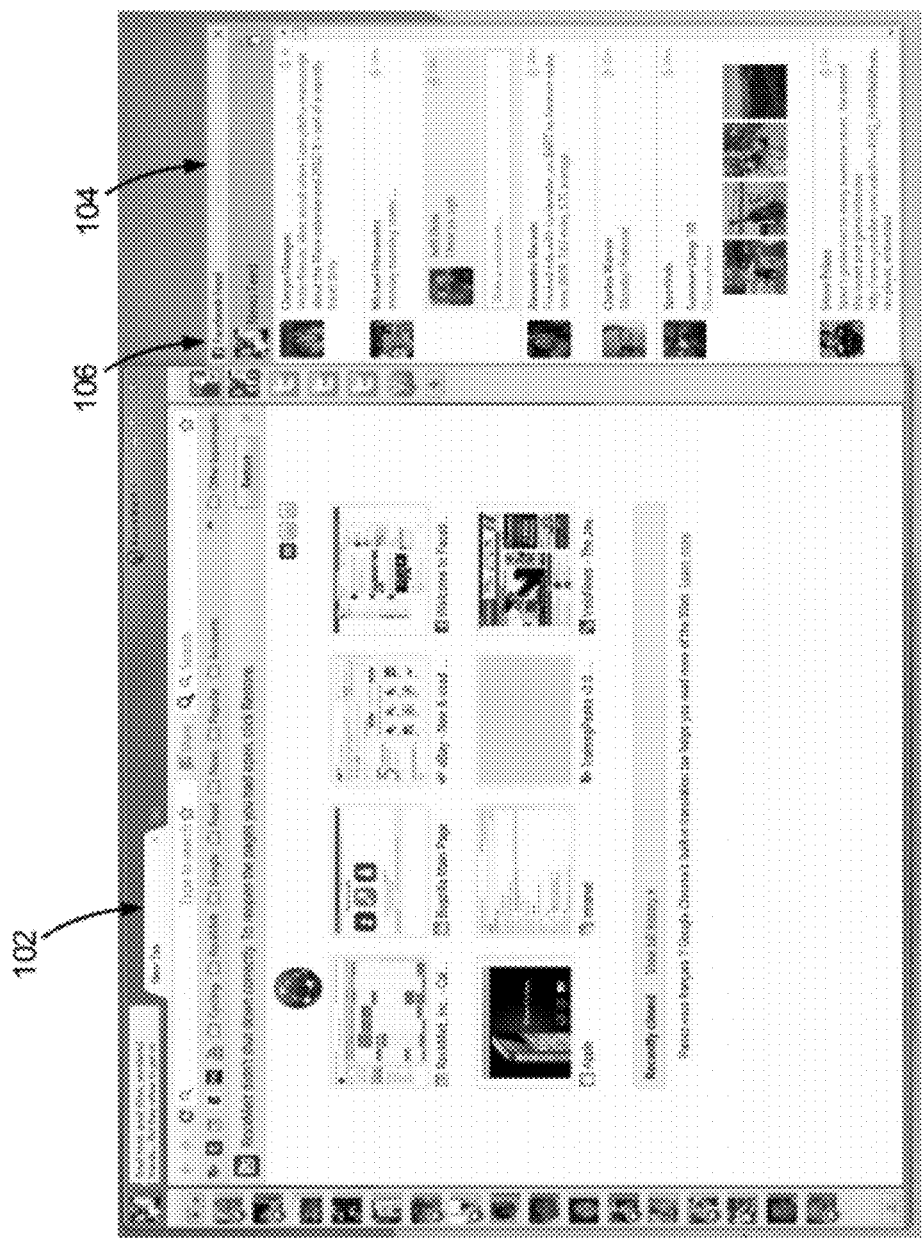
FIG. 2 is a second embodiment of a user interface illustrating a primary window and a secondary window displayed adjacent to each other.

Additionally, the windows module displays a toggle switch 106 in the vicinity of the secondary window 104. The toggle switch 106 provides the user with the flexibility of moving the secondary window 104 to a different location such that the secondary window 104 does not hinder or block the display of primary window 102. FIG. 2 illustrates one such placement of secondary window 104. As displayed in FIG. 2, in response to a selection of toggle switch 106, the windows module displays the secondary window 104 adjacent to the primary window 102. Later, the user may again select the toggle switch 106 and the windows module displays the secondary window 104 in its initial state as illustrated in FIG. 1.

In one embodiment, the windows module determines the amount of desktop space available to the browser 100 before moving the secondary window 104 to a different location. If adequate space is available to display the secondary window 104 in a new location, the windows module displays the secondary window 104 in the new location. On the other hand, if adequate space is unavailable because the browser 100 completely occupies a user's desktop or for some other reason, the windows module determines the size of the secondary window 104, resizes the primary window 102 to make room for the secondary window 104 and renders both the windows 102-104 next to each other. In another embodiment, the windows module resizes both the primary window 102 and the secondary window 104 to make room for displaying both the windows 102-104 simultaneously. The windows module may or may not resize both the windows 102-104 proportionally. For example, the windows module may reduce the length and width of both the windows by 20% of their initial dimensions. Or, the windows module may reduce the dimensions of the primary window 102 by 35% and dimensions of the secondary window by 10%.

Additionally, as illustrated in FIG. 2, the windows module may place the two windows 102-104 such that the edges, i.e. the sides, of the two windows 102-104 overlap with or touch each other. The windows module determines the boundaries of the primary window 102 and places the secondary window 104 next to the determined boundary. Such placement beneficially communicates to the user that the two windows 102-104 are related to each other and efficiently utilizes the desktop space by avoiding any wasted space between the two windows. Moreover, such placement of overlapping windows 102-104 beneficially reduces for the user the tedious manual job of placing the windows next to each other such that the edges of the windows overlap with each other.

In one embodiment, the windows module combines the control of the primary window 102 and the secondary window 104 such that both the windows can be handled as one object. Accordingly, the user may minimize, maximize, resize, move or close both the windows by applying the desired function to the primary window 102 or the secondary window 104. At some point, the user may separate the two windows 102-104 by dragging them apart. Once the windows are dragged apart, the windows 102-104 module may treat the two windows 102-104 as two separate windows with separate and distinct controls. Alternatively, the windows module treats the two windows 102-104 as one combined object with combined control even after the two windows 102-104 are dragged apart.

In yet another embodiment, the windows module applies the same function to the secondary window 104 as the function selected by the user for the primary window 102. However, the windows module does not apply to the primary window 102 the function selected by the user for the secondary window 104. Accordingly, closing the primary window 102 results in closing the secondary window 104. However, closing the secondary window 104 does not result in closing the secondary window 104.

Figure 3:
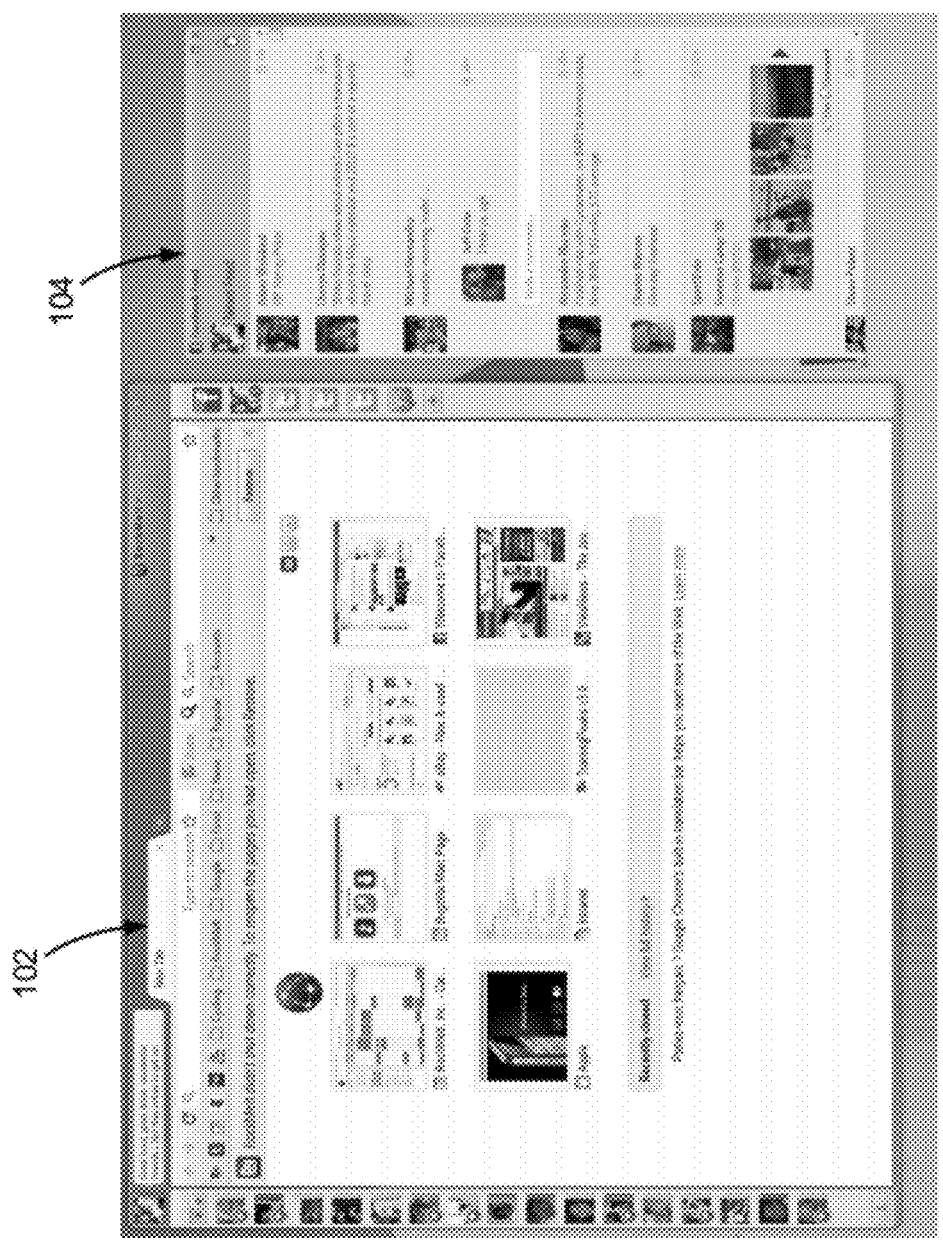
FIG. 3 is a user interface illustrating a primary window and a secondary window separated from each other, according to one embodiment.

As discussed above, the two windows 102-104 can be separated or torn apart from each other. FIG. 3 displays the two windows 102-104 torn apart. To rejoin the two windows 102-104, a user may drag one of the windows 102 closer to the other window 104. Once the windows 102-104 are within a pre-determined vicinity of each other, the windows module align the two windows 102-104 such that the edges of the two windows 102-104 overlap with each other or touch each other.

The description above discloses the windows module managing windows associated with an application for illustration purposes. One of ordinary skill in the art will understand that the windows module may manage windows in multiple applications in a similar manner. Accordingly, the windows module may manage two windows for an application or a window each for two different applications as the primary window 102 and the secondary window 104. Additionally, a similar module in an operating system can manage windows for one or more applications in a similar manner. Moreover, the description above discloses the windows module managing two windows for illustration purposes. One or ordinary skill in the art will understand that the windows module can manage more than two windows and provide the above described functionality for more than two windows.

Computer Architecture

Figure 4:
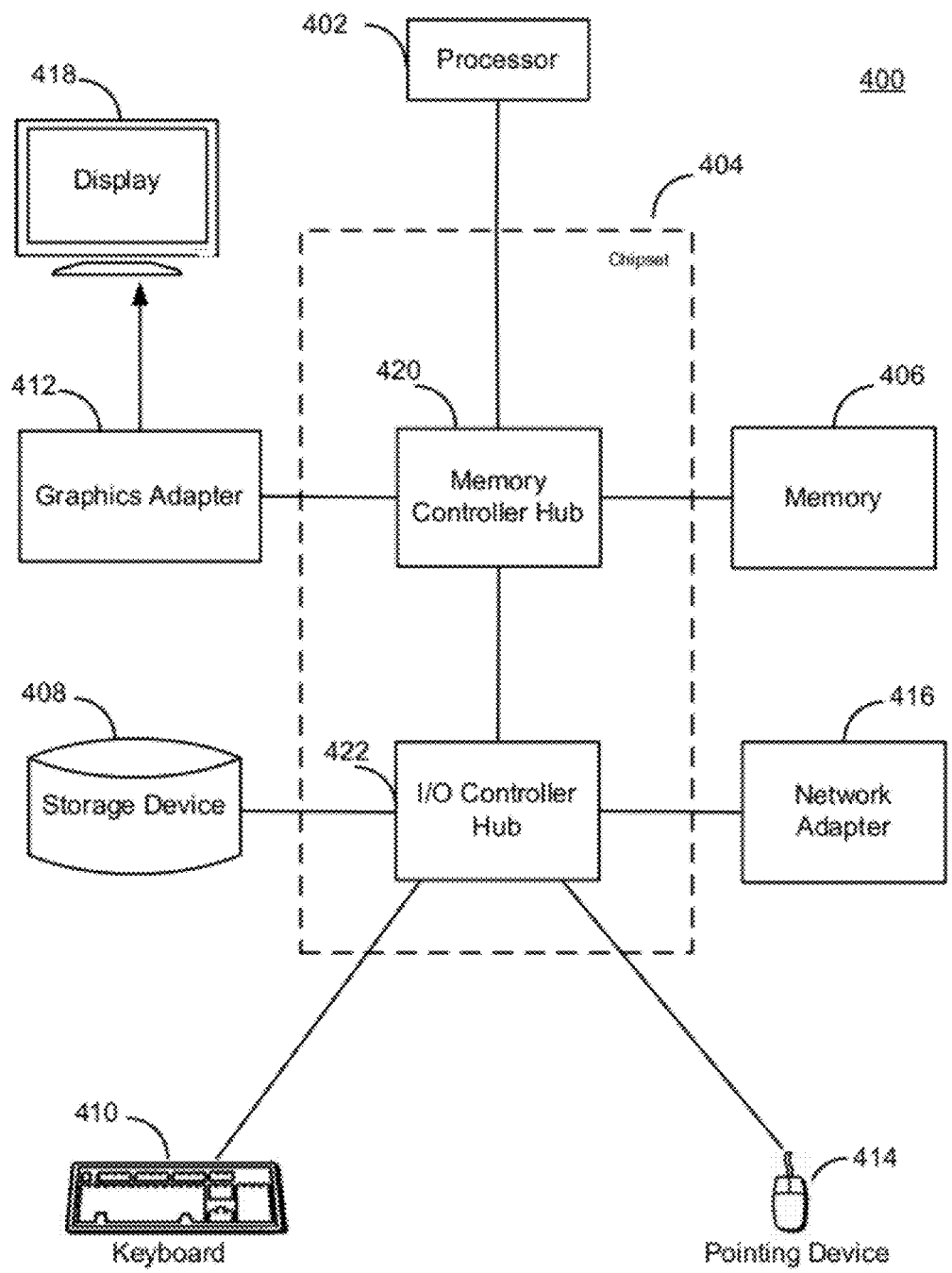
FIG. 4 is a block diagram illustrating an example of a computer for use in displaying user interfaces illustrated in FIGS. 1-3, according to one embodiment.

The windows module is implemented using one or more computers. FIG. 4 is a high-level block diagram illustrating an example computer 400. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer system 400. The graphics adapter 412 displays images and other information on the display 418. The network adapter 416 couples the computer system 400 to one or more computer networks.

The types of computers 400 used to implement the windows module can vary depending upon the embodiment and the processing power required by the entity. For example, the windows module might comprise multiple blade servers working together to provide the functionality described herein. The computers 400 can lack some of the components described above, such as keyboards 410, graphics adapters 412, and displays 418.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the user interface arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for displaying a plurality of windows, the method comprising:
   displaying a first window and a second window, the first window being displayed in a first location and having a first size, the second window being displayed in a second location and having a second size;
   receiving a window adjustment input, the window adjustment input indicating a request to adjust at least one of the displayed first window or the second window;
   after receiving the window adjustment input, determining by a processor a new second location in which to display the second window, wherein the window adjustment input does not specify or indicate the new second location or a new first location for the first window;
   after receiving the window adjustment input, determining by a processor whether to resize the first window or change the first location;
   resizing the first window or changing the first location of the first window according to a result of determining whether to resize the first window or change the first location;
   displaying the second window in the new second location;
   in response to receiving an indication of a selection of a toggle switch, returning windows to their previous sizes and locations, wherein returning windows to their previous sizes and locations includes displaying the first window at the first location such that the first window has the first size and displaying the second window at the second location such that the second window has the second size;
   receiving a second window adjustment input dragging the second window within a threshold distance of the first window or dragging the first window within the threshold distance of the second window;
   responsive to receiving the second window adjustment input, combining control of the first window and the second window, the combined control enabling handling of the first window and the second window as one object; and
   separating controls of the first window and the second window in response to receiving a subsequent window adjustment input dragging the first window and the second window apart, the separated controls enabling handling of the first window and the second window as two separate objects.

2. The computer-implemented method of claim 1, wherein prior to determining a new second location to display the second window, the second window at least partially blocks the first window and the new location of the second window does not hinder the display of the second window.

3. The computer-implemented method of claim 1, further comprising:
after receiving the window adjustment input, the first window and the second window are displayed such that an edge of the first window touches an edge of the second window.

4. The computer-implemented method of claim 1, further comprising:
after receiving the window adjustment input, the first window and the second window are displayed such that edges of the first window are separated from edges of the second window.

5. The computer-implemented method of claim 1, wherein a size of the first window is unchanged responsive to determining whether to resize the first window.

6. The computer-implemented method of claim 1, further comprising:
resizing at least one of the first window or the second window.

7. The computer-implemented method of claim 1, further comprising:
responsive to receiving a request to display an additional window, determining whether a number of windows currently displayed are at a threshold; and
responsive to the number of currently displayed windows being at the threshold, removing at least one displayed window from a display and displaying the additional window.

8. A computer program product for displaying a plurality of windows, the computer program product comprising a non-transitory computer-readable storage medium containing computer program code for:
displaying a first window and a second window, the first window displayed in a first location and having a first size and the second window displayed in a second location and having a second size;
receiving a window adjustment input indicating a request to adjust at least one of the displayed first window or the second window;
after receiving the window adjustment input, determining by a processor a new second location in which to display the second window, wherein the window adjustment input does not specify or indicate the new second location or a new first location for the first window;
after receiving the window adjustment input, determining by a processor whether to resize the first window;
resizing the first window according to a result of determining whether to resize the first window;
displaying the second window in the new second location;
in response to receiving an indication of a selection of a toggle switch, returning windows to their previous sizes and locations, wherein returning windows to their previous sizes and locations includes displaying the first window at the first location such that the first window has the first size and displaying the second window at the second location such that the second window has the second size;
receiving a second window adjustment input dragging the second window or the first window such that the first window and the second window are within a threshold distance of one another;
responsive to receiving the second window adjustment input, combining the control of the first window and the second window, the combined control enabling handling of the first window and the second window as one object; and
separating controls of the first window and the second window in response to receiving a subsequent window adjustment input dragging the first window and the second window apart, the separated controls enabling handling of the first window and the second window as two separate objects.

9. The computer program product of claim 8, wherein prior to determining a new second location to display the second window, the second window at least partially blocks the first window and the new location of the second window does not hinder the display of the second window.

10. The computer program product of claim 8, wherein after receiving the window adjustment input, the first window and the second window are displayed such that an edge of the first window touches an edge of the second window.

11. The computer program product of claim 8, wherein after receiving the window adjustment input, the first window and the second window are displayed such that edges of the first window are separated from edges of the second window.

12. The computer program product of claim 8, wherein a size of the first window is unchanged responsive to determining whether to resize the first window.

13. The computer program product of claim 8, further comprising computer program code for:
resizing at least one of the first window or the second window.

14. The computer program product of claim 8, further comprising computer program code for:
responsive to receiving a request to display an additional window, determining whether a number of windows currently displayed are at a threshold; and
responsive to the number of currently displayed windows being at the threshold, removing at least one displayed window from a display and displaying the additional window.

15. An apparatus, comprising:
a processor; and
a memory, at least one of the processor or the memory being adapted for:
displaying a first window and a second window, the first window displayed in a first location and having a first size and the second window displayed in a second location and having a second size;
receiving a window adjustment input, the window adjustment input indicating a request to adjust at least one of the displayed first window or the second window;
after receiving the window adjustment input, determining a new second location in which to display the second window, wherein the window adjustment input does not specify or indicate the new second location or a new first location for the first window;
after receiving the window adjustment input, determining whether to resize the first window;
resizing the first window according to a result of determining whether to resize the first window;
displaying the second window in the new second location;
in response to receiving an indication of a selection of a toggle switch, returning windows to their previous sizes and locations, wherein returning windows to their previous sizes and locations includes displaying the first window at the first location such that the first window has the first size and displaying the second window at the second location such that the second window has the second size;

receiving a second window adjustment input dragging the second window or the first window such that the first window and the second window are within a threshold distance of one another;

responsive to receiving the second window adjustment input, combining the control of the first window and the second window, the combined control enabling handling of the first window and the second window as one object; and separating controls of the first window and the second window in response to receiving a subsequent window adjustment input dragging the first window and the second window apart, the separated controls enabling handling of the first window and the second window as two separate objects.

* * * * *